US007899193B2

(12) United States Patent
Bekiares et al.

(10) Patent No.: US 7,899,193 B2
(45) Date of Patent: Mar. 1, 2011

(54) TIME ALIGNED GROUP AUDIO REPRODUCTION IN NARROWBAND AND BROADBAND NETWORKS

(75) Inventors: Tyrone D. Bekiares, Chicago, IL (US); Robert D. Logalbo, Rolling Meadows, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 286 days.

(21) Appl. No.: 12/133,882

(22) Filed: Jun. 5, 2008

(65) Prior Publication Data
US 2009/0304201 A1 Dec. 10, 2009

(51) Int. Cl.
*H04B 3/00* (2006.01)
(52) U.S. Cl. .................. 381/77; 709/205; 709/244; 455/91
(58) Field of Classification Search .......... 709/217, 709/205, 244; 381/77; 455/91
See application file for complete search history.

(56) References Cited

U.S. PATENT DOCUMENTS

| 5,485,632 | A | 1/1996 | Ng et al. |
| 6,253,207 | B1 * | 6/2001 | Malek et al. .................. 1/1 |
| 2006/0133309 | A1 * | 6/2006 | Mathis et al. .............. 370/328 |
| 2006/0159280 | A1 * | 7/2006 | Iwamura .................... 381/79 |
| 2009/0013086 | A1 * | 1/2009 | Greenbaum ................ 709/231 |

OTHER PUBLICATIONS

A Group Synchronization Mechanism for Stored Media in Multicast Communications; Ishibashi et. at Proceedings of the INFOCOM '97. Sixteenth Annual Joint Conference of the IEEE Computer and Communications Societies; p. 692-700; ISBN: 0-8186-7780-5; Year of Publication: 1997.*

PCT Search Report Dated Feb. 19, 2010.
Escobar, et al. "Flow Synchronization Protocol"; IEEE/ACM Transactions on Networking, NY, USA; vol. 2 No. 2; Apr. 1, 1994, pp. 111-120; XP000458366; ISSN:1063-6692.
Ishibashi Y, et al. "A Group Synchronization Mechanism for Live Media in Multicast Communications" Global Telecommunications Conference, 1997. GLOVECOM '97; IEEE Phoenix, AZ, USA, Nov. 3-8, 1997, NY, USA, IEEE; vol. 2, Nov. 3, 1997, pp. 746-752; XP010254701; ISBN:978-0-7803-4198-2.
Segui, et al. Multimedia Group Synchronization Algorithm Based on RTP/RTCP.
Segui, et al. "Multimedia Group Synchronizatio Algorithm Based On RTP/RTCP"; Proceedings Of The Eighth IEEE International Symposium On Multimedia (ISM 2006); 2006; 4 Pages.
PCT International Preliminary Report On Patentability Dated Dec. 6, 2010.

* cited by examiner

*Primary Examiner*—Carl Colin
*Assistant Examiner*—Harunur Rashid
(74) *Attorney, Agent, or Firm*—Anthony P. Curtis

(57) ABSTRACT

A method for synchronizing media reproduction across heterogeneous networks is presented. The networks include end-to-end IP broadband and narrowband simulcast networks that contain broadband and narrowband devices associated with a common communications group. A controller in the networks determines delay times for reproduction of a media stream across devices in the networks and establishes the longest delay time. The longest delay time is used to calculate appropriate transmission and reproduction timestamps to permit the devices to reproduce the provided media stream in synchronization. Narrowband base stations repeat the media stream at the time specified by a transmission timestamp, and broadband end devices reproduce the media stream at the time specified by a reproduction timestamp. By synchronizing the presentation time, the devices present the media at substantially the same time and are granted fair rights to communicate with one another.

20 Claims, 4 Drawing Sheets

TIME ALIGNED GROUP AUDIO REPRODUCTION IN NARROWBAND AND BROADBAND NETWORKS

TECHNICAL FIELD

The present application relates to heterogeneous networks. In particular, the application relates to simultaneous reproduction of an audio signal in heterogeneous networks.

BACKGROUND

Group-directed communications are commonplace in enterprise and public safety communication systems. With regard to voice communications, one end device directs an audio stream to a given group (i.e. a "talkgroup") of receiving end devices. These receiving end devices reproduce the audio stream through an amplified speaker. The manner in which the receiving end devices are used usually results in the reproduced sound being audible to people other than merely the intended recipient. Typically, the receiving end devices are often located near each other, causing their associated listeners to hear the same audio stream simultaneously reproduced by multiple end devices. This is particularly true in public safety uses, in which personnel often respond to incidents in a group and this group (or a subset thereof) may be located in the same local area for an extended period of time.

In order to ensure the audio stream is intelligible to the intended listeners in such an environment, it is desirable for collocated devices to reproduce the audio stream in a time synchronized fashion. In other words, all amplified speakers in the collocated devices should reproduce the same audio waveform at roughly the same instant in time. In general, a temporal offset of at most 30 ms between multiple audible speakers reproducing the same waveform is virtually undetectable to most listeners. Modern wireless voice communication systems achieve synchronized presentation of group-directed audio through an over-the-air simulcast of circuit-switched audio at multiple transmitting sites. Dense populations of collocated end devices thus receive the same over-the-air signal at roughly the same instant in time.

Such methods of synchronized presentation work well for the specialized homogeneous narrowband circuit-switched wireless radio networks typically used in the current generation of enterprise and public safety communication systems. However, the next generation of such communication systems is likely to span multiple narrowband circuit-switched and broadband packet-switched Radio Area Network (RAN) technologies with wholly different methods of synchronization. Example circuit-switched narrowband RAN technologies include 25 kHz, 12.5 kHz, or 6.25 kHz equivalent FDMA or TDMA air interfaces (e.g. Project 25, TETRA, DMR). Example packet-switched broadband RAN technologies include LTE, UMTS, EVDO, WiMAX, and WLAN air interfaces. Without a mechanism to synchronize media reproduction in a communication system comprised of heterogeneous RAN technologies, end devices connected to the circuit-switched narrowband RAN and end devices connected to the packet-switched broadband RAN would reproduce the same audio waveform in an autonomous fashion with respect to one another. This cacophony of misaligned sound results in unintelligible audio communication where multiple narrowband and broadband end devices are collocated.

Additionally, half-duplex group communication systems provide a mechanism to ensure equitable speaking rights on a given shared communication resource such as a channel or "talkgroup." To provide this, the floor (i.e. the right to broadcast) is typically granted to the first device to make an appropriate request. During a half-duplex group conversation, listeners wait for the current audio stream to finish before initiating a new floor request. If the floor is granted to the first requester, it is desirable that all listeners be given the opportunity to request the floor at the same instant. This can be achieved if the preceding audio stream ends at the same time for all listeners.

In addition to potential intelligibility problems, without synchronized audio reproduction, the same audio stream will terminate at different times for listeners whose end devices are connected via different RAN technologies. Since floor control is typically granted to the first requester, end devices whose reproduced audio stream is lagging are not given equal rights for floor acquisition. Thus, it is desirable to provide a mechanism to synchronize audio reproduction across end devices operating on heterogeneous RANs.

BRIEF DESCRIPTION OF THE DRAWINGS

Embodiments will now be described by way of example with reference to the accompanying drawings, in which.

DETAILED DESCRIPTION

Coordinated media (e.g. audio) reproduction across different communication networks, such as narrowband (hereinafter referred to as NB) simulcast and broadband (hereinafter referred to as BB) networks, is presented.

The presentation time of media to a heterogeneous group of end devices containing, for example, NB End Devices and BB End Devices, is time aligned such that an audio signal, for example, is reproduced at roughly the same time for all of the End Devices. This synchronization provides coherent group audio reproduction, which allows multiple listeners to hear the same audio signal from heterogeneous End Devices in the same physical vicinity without the interference caused by misaligned and overlapping audio streams. In addition, the synchronization ensures fair floor access in half-duplex communication systems as each listener is given the opportunity to attempt floor acquisition at the same time.

Figure 1:
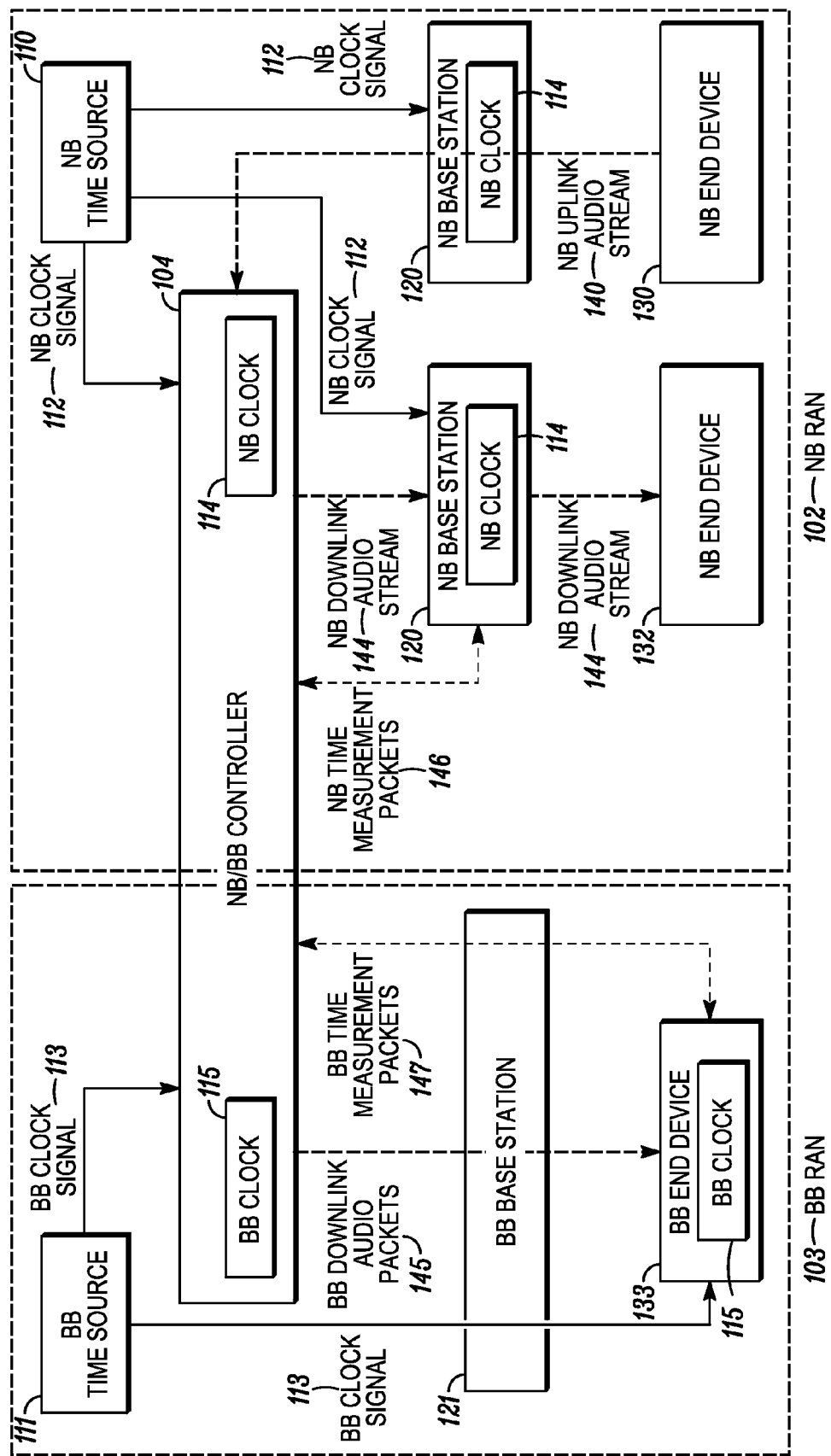
FIG. 1 illustrates one embodiment of a system.

One embodiment of a group communication system containing multiple heterogeneous RAN technologies is depicted in FIG. 1. The embodiment of FIG. 1 includes a NB simulcast RAN (hereinafter referred to as NB RAN 102), which could be, for example, part of a Project 25 compliant PTT system. FIG. 1 also includes a BB RAN 103, which could be, for example, part of an OMA PoC (Open Mobile Alliance Push-to-talk over Cellular) compliant PTT system. Integrated together, they form a single communication System 100. Specifically, the System 100 shown in FIG. 1 includes a NB/BB Controller 104, a NB Time Source 110, a BB Time Source 111, NB Base Stations 120, BB Base Stations 121, NB End Devices 130, 132 and BB End Devices 133. The NB/BB Controller 104 has the ability to independently delay a group-directed audio signal to the NB RAN 102 or BB RAN 103, thereby accommodating the NB or BB End Device 132, 133 which exhibits a statistically significant, e.g. worst case, delay of an audio signal measured from the NB/BB Controller 104 to its reproduction in the NB or BB End Device 132, 133. In practice, the delay of an audio signal from the NB/BB Controller 104 to its reproduction in BB End Devices 133, only one of which is shown for convenience, is typically significantly longer with respect to the same audio signal transmitted to and reproduced by NB End Devices 132.

Each of the NB and BB End Devices 130, 132, 133 is a user device that has a transmitter and receiver (not shown). Although mobile NB or BB End Devices are described, at least some of the NB or BB End Devices 130, 132, 133 may be geographically fixed. The NB or BB End Devices 130, 132, 133 communicate with other NB or BB End Devices 130, 132, 133 via an associated NB Base Station 120 or BB Base Station 121, respectively, as well as other not depicted interconnections of the System 100 and associated functions including the NB/BB Controller 104. Note that while only one intermediary (illustrated as a Base Station) is shown between each of the NB and BB End Devices 130, 132, 133 and the NB/BB Controller 104 for convenience, one or more intermediaries of different types may be inserted depending on the specific RAN technology deployed. Although NB Base Stations 120 or BB Base Stations 121 and other intermediaries may be mobile (handsets or vehicle mounted), such elements alternatively may be geographically fixed. Each of the NB and BB End Devices 130, 132, 133 also has a speaker (not shown) through which the End Device provides acoustic reproduction of audio to the user, in addition to other circuitry and input/output mechanisms.

The NB End Devices 130, 132 communicate through the NB RAN 102. Examples of such NB End Devices 130, 132 include portable and mobile NB radios or any other End Device which connects, in a wireless fashion, to the NB RAN 102. These NB End Devices 130, 132 are connected to the NB/BB Controller 104 via NB Base Stations 120. Referring to FIG. 1, one of the NB End Devices 130 requests and is granted the floor (i.e. the right to speak on a given communication resource) from a floor controller (not shown) of System 100. This NB End Device 130 transmits an audio stream (hereinafter referred to as NB Uplink Audio Stream 140) to the NB/BB Controller 104 via the NB Base Station 120. The other NB End Devices 132 receive the repeated audio stream (hereinafter referred to as NB Downlink Audio Stream 144) from the NB/BB Controller 104 via one or more NB Base Stations 120.

The BB End Devices 133 communicate through the BB RAN 103. Examples of such BB End Devices 133 include cell phones, PDAs, laptop computers, or any other End Device which connects, in a wired or wireless fashion, to the BB RAN. The BB End Devices 133 are connected to the NB/BB Controller 104 through BB Base Stations 121. Only one BB End Device 133 and one BB Base Station 121 are shown in FIG. 1 for clarity. The BB End Devices 133 receive the audio stream (hereinafter referred to as BB Downlink Audio Packets 145) from the NB/BB Controller 104 via BB Base Stations 121. Although not illustrated in FIG. 1, BB End Devices 133 along with other components of System 100 not shown in FIG. 1 (e.g. a wired voice dispatch console) are equally capable of requesting the floor and transmitting an audio stream to the NB/BB Controller 104.

The NB/BB Controller 104 is a combined NB simulcast and BB controller that is responsible for duplicating and routing audio streams to all NB and BB End Devices 130, 132, 133 affiliated to the same logical group. The NB and BB End Devices 130, 132, 133 join a group, for example, by turning a physical knob on the device to select a particular logical "talkgroup" or "channel."

In the NB RAN 102, the NB/BB Controller 104 synchronizes a simulcast transmission of the NB Downlink Audio Stream 144 at the appropriate NB Base Stations 120 by specifying a transmission timestamp (hereinafter referred to as $NB_{TransmissionTimestampN}$) for each audio frame (hereinafter referred to as $Audio_{FrameN}$) contained in the NB Downlink Audio Stream 144. $NB_{TransmissionTimestampN}$ is expressed in values relative to a common clock reference (hereinafter referred to as NB Time Source 110) known to the NB/BB Controller 104 and the NB Base Stations 120. The NB/BB Controller 104 and the NB Base Stations 120 contain very high precision, nanosecond-accurate, internal clocks (hereinafter referred to as NB Clocks 114) synchronized to a common NB Time Source 110, e.g. the Global Positioning Satellite (GPS) system 1 PPS (Pulse Per Second), via NB Clock Signal 112. When the NB/BB Controller 104 receives the NB Uplink Audio Stream 140 from one of the NB End Devices 130 via a NB Base Station 120, the NB/BB Controller 104 repeats the series of received $Audio_{FrameN}$s, along with an associated series of $NB_{TransmissionTimestampN}$s, in NB Downlink Audio Stream 144 to the appropriate NB Base Stations 120. Upon receiving NB Downlink Audio Stream 144, the participating NB Base Stations 120 wait until their synchronized NB Clocks 114 are exactly equal to $NB_{TransmissionTimestampN}$ specified for a given $Audio_{FrameN}$. At that instant in time, the participating NB Base Stations 120 simultaneously repeat $Audio_{FrameN}$ to all NB End Devices 132 affiliated to the group to which the audio stream is directed.

However, the combined NB/BB Controller 104 does not merely repeat the same NB Downlink Audio Stream 144 provided to NB Base Stations 120 to BB End Devices 133 (by way of BB Base Stations 121). One reason for this is that the timing and synchronization mechanisms used in the NB RAN 102 are typically quite different from those available in the BB RAN 103. Although it is theoretically possible to extend the same time-stamped NB Downlink Audio Stream 144 to BB End Devices 133 if a similar timing mechanism (e.g. a very high precision GPS-locked clock) were disposed in the BB End Devices 133, providing the BB End Devices 133 with such equipment may be impracticable at least due to cost, size, and location concerns. Additionally, the values of $NB_{TransmissionTimestampN}$ present in NB Downlink Audio Stream 144 specify a transmission time for $Audio_{FrameN}$. This transmission time is not inclusive of the time needed to process and acoustically reproduce $Audio_{FrameN}$. Since the amount of time used to perform these functions likely differs amongst NB and BB End Devices, BB End Devices 133 do not possess enough information to synchronize their audio reproduction with that of NB End Devices 132.

The NB/BB Controller 104 and the BB End Devices 133 shown in FIG. 1 contain moderate precision, millisecond-accurate, internal clocks (hereinafter referred to as BB Clocks 115) locked to a common BB Time Source 111, e.g. a time-of-day clock, via BB Clock Signal 113. Unlike simulcast transmission, which is achieved using nanosecond-accurate timing mechanisms present in participating NB Base Stations 120, time aligned reproduction of audio can be achieved using merely the millisecond-accurate timing mechanisms present in participating BB End Devices 133. The NB/BB Controller 104 specifies a reproduction timestamp (hereinafter referred to as $BB_{ReproductionTimestampN}$) for one or more $Audio_{FrameN}$(s) contained in BB Downlink Audio Packets 145 repeated to the appropriate BB End Devices 133 (i.e., the BB End Devices 133 that have selected the channel and joined the group to which the $Audio_{FrameN}$(s) are transmitted). BB Downlink Audio Packets 145 are formatted, for example, using the Real-time Transport Protocol (RTP). $BB_{ReproductionTimestampN}$s embedded in BB Downlink Audio Packets 145 are relative to the common BB Time Source 111 and inform the BB End Devices 133 as to the exact time the associated $\text{Audio}_{FrameN}$ is to be acoustically reproduced. Upon receiving a BB Downlink Audio Packet 145, the participating BB End Device 133 waits until their synchronized BB Clocks 115 are exactly equal to $\text{BB}_{ReproductionTimestampN}$ specified for a given $\text{Audio}_{FrameN}$. At that instant in time, the participating BB End Devices 133 simultaneously reproduce $\text{Audio}_{FrameN}$.

The theoretical delay from the time at which NB/BB Controller 104 sends an audio signal until the time at which NB End Devices 132 reproduce that audio signal is calculated by a processor (not shown) in the NB/BB Controller 104 prior to the NB/BB Controller 104 receiving a NB Uplink Audio Stream 140. Recall that NB Base Stations 120 and the NB/BB Controller 104 contain NB Clocks 114 synchronized to the same NB Time Source 110. To measure the signal propagation delay from the NB/BB Controller 104 to each NB Base Station 120, the NB/BB Controller 104 samples the value of NB Clock 114, and sends a time-stamped message containing this value (hereinafter referred to as NB Time Measurement Packets 146) to each NB Base Station 120. Upon receiving NB Time Measurement Packet 146, a NB Base Station 120 subtracts the embedded timestamp from its NB Clock 114 to derive the one-way signal propagation delay (hereinafter referred to as $\text{NB}_{PropagationDelayBaseSiteN}$) between the NB/BB Controller 104 and the NB Base Station 120. $\text{NB}_{PropagationDelayBaseSiteN}$ is then sent back to the NB/BB Controller 104 where it is recorded in a memory (not shown). All such $\text{NB}_{PropagationDelayBaseSiteN}$ measurements to each NB Base Station 120 are then compared and a statistically significant (e.g. worst case, 99% worst case, 95% worst case, 90% worst case) one-way propagation delay (hereinafter referred to as $\text{NB}_{PropagationDelay}$) from the NB/BB Controller 104 to all NB Base Stations 120 is recorded in the NB/BB Controller 104. The wireless propagation delay between the NB Base Station 120 and the NB End Devices 132 is comparatively negligible. The statistically significant delay from the time an audio frame is sent from the NB/BB Controller 104 to the time the audio signal it contains is acoustically reproduced by the speaker in a NB End Device 132 is then calculated as:

$$NB_{ReproductionDelay} = NB_{PropagationDelay} + NB_{DeviceProcessingDelay}$$

where $\text{NB}_{DeviceProcessingDelay}$ is the known time to process (e.g., demodulate, error-correct, and decode) the audio signal in the NB End Devices 132. $\text{NB}_{DeviceProcessingDelay}$ is measured or estimated prior to the NB End Devices 132 being shipped and device-to-device variation is comparatively negligible. $\text{NB}_{ReproductionDelay}$ may be periodically recalculated by NB/BB Controller 104, which permits modification of $\text{NB}_{ReproductionDelay}$ as participating NB Base Stations 120 are added to or removed from the NB RAN 102.

Figure 3:
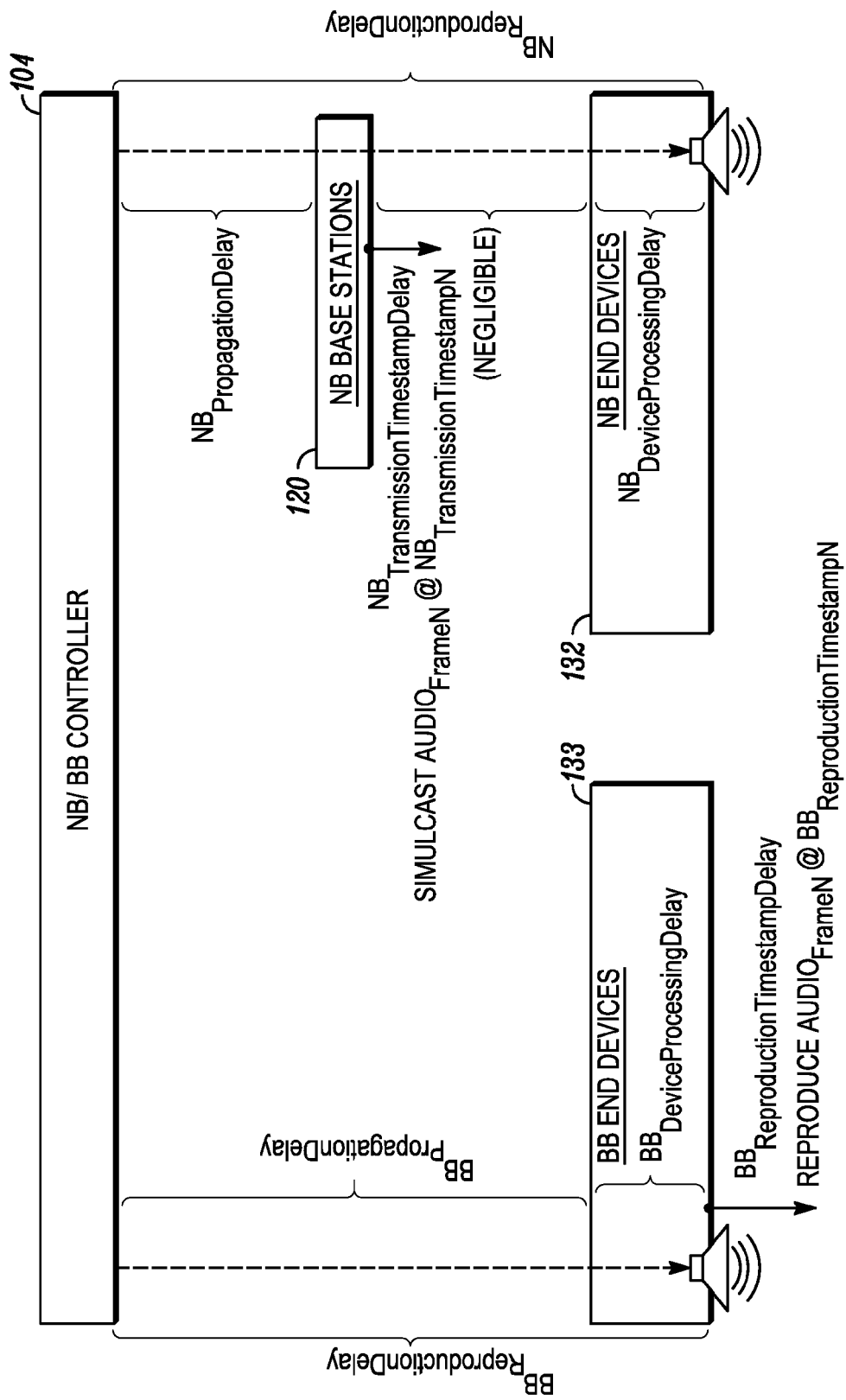
FIG. 3 illustrates the calculated time delays in the embodiment of FIG. 1.

Similarly, the theoretical delay from the time at which NB/BB Controller 104 sends an audio signal until the time at which BB End Devices 133 reproduce that audio signal is calculated by the processor in the NB/BB Controller 104 prior to it receiving NB Uplink Audio Stream 140. Recall that BB End Devices 133 and the NB/BB Controller 104 contain BB Clocks 115 synchronized to the same BB Time Source 111. To measure the signal propagation delay from the NB/BB Controller 104 to each BB End Device 133, the NB/BB Controller 104 samples the value of BB Clock 115, and sends a time-stamped message containing this value (hereinafter referred to as BB Time Measurement Packets 147) to a representative set, e.g. all, of the BB End Devices 133. Upon receiving BB Time Measurement Packet 147, the BB End Device 133 subtracts the embedded timestamp from its BB Clock 115 to derive the one-way signal propagation delay between the NB/BB Controller 104 and the BB End Device 133 (hereinafter referred to as $\text{BB}_{PropagationDelayDeviceN}$). All such $\text{BB}_{PropagationDelayDeviceN}$ measurements are then compared and the statistically significant one-way propagation delay (hereinafter referred to as $\text{BB}_{PropagationDelay}$) from the NB/BB Controller 104 to the representative set of BB End Devices 133 is recorded in the NB/BB Controller 104. The statistically significant delay from the time an audio frame is sent from the NB/BB Controller 104 to the time the audio signal it contains is acoustically reproduced by the speaker in the BB End Device 133 is then calculated as:

$$BB_{ReproductionDelay} = BB_{PropagationDelay} + BB_{DeviceProcessingDelay}$$

where $\text{BB}_{DeviceProcessingDelay}$ is the known time to process (e.g., demodulate, error-correct, de-jitter, and decode) audio packets in the BB End Devices 133. Similar to $\text{NB}_{DeviceProcessingDelay}$, $\text{BB}_{DeviceProcessingDelay}$ is measured or estimated prior to BB End Device 133 being shipped and device-to-device variation is again comparatively negligible. As above, $\text{BB}_{ReproductionDelay}$ may be periodically recalculated by NB/BB Controller 104, which permits modification of $\text{BB}_{ReproductionDelay}$ as participating BB End Devices 133 are added to or removed from the BB RAN 103. A diagram of the time delays described above in relation to the embodiment of FIG. 1 is shown in FIG. 3.

As above, the NB/BB Controller 104 specifies a $\text{NB}_{TransmissionTimestampN}$ to NB Base Stations 120 and a $\text{BB}_{ReproductionTimestampN}$ to BB End Devices 133 for each $\text{Audio}_{FrameN}$ repeated. To facilitate this, the NB/BB Controller 104 calculates the delay from a starting time 0, in units of the NB Clock 114, at which time the first $\text{Audio}_{Frame0}$ is to be simulcast by NB Base Stations 120 (hereinafter referred to as $\text{NB}_{TransmissionTimestampDelay}$) and the delay from the same starting time 0, in units of the BB Clock 115, at which time the first $\text{Audio}_{Frame0}$ is to be reproduced by BB End Devices 133 (hereinafter referred to as $\text{BB}_{ReproductionTimestampDelay}$). In an ordinary NB RAN 102, $\text{NB}_{TransmissionTimestampDelay}$ is calculated by the NB/BB Controller 104 to be equal to $\text{NB}_{PropagationDelay}$. Here, however, $\text{NB}_{TransmissionTimestampDelay}$ and $\text{NB}_{PropagationDelay}$ are calculated via the following algorithm:

IF $BB_{ReproductionDelay^*} \leq NB_{ReproductionDelay}$ THEN:

$$NB_{TransmissionTimestampDelay} = NB_{ReproductionDelay} - NB_{DeviceProcessingDelay};$$

AND $$BB_{ReproductionTimestampDelay} = NB_{ReproductionDelay^*};$$

ELSE IF $BB_{ReproductionDelay^*} > NB_{ReproductionDelay}$ THEN:

$$NB_{TransmissionTimestampDelay} = BB_{ReproductionDelay^*} - NB_{DeviceProcessingDelay};$$

AND $$BB_{ReproductionTimestampDelay} = BB_{ReproductionDelay};$$

where $\text{BB}_{ReproductionDelay^*}$ is $\text{BB}_{ReproductionDelay}$ in units of NB Clock 114, and $\text{NB}_{ReproductionDelay^*}$ is $\text{NB}_{ReproductionDelay}$ in units of BB Clock 115. This translation between clock units is possible, since NB/BB Controller 104 knows the respective frequencies (e.g. 1 kHz, 1 MHz, 1 GHz) and relationship (i.e.

at a given instant in time, it can sample both clocks) of both NB Clock 114 and BB Clock 115.

$NB_{TransmissionTimestampDelay}$ and $BB_{ReproductionTimestampDelay}$ may be stored on a per-group basis in a periodically-updated database in the NB/BB Controller 104. This permits the NB/BB Controller 104 to adjust these values whenever a new NB or BB End Device 130, 132, 133 joins or leaves the group if the particular End Device statistically affects these calculated delay values in a significant way (e.g., greater than 1%, 2%, 5%, 10%, etc.). When a new End Device joins a particular group, the NB/BB Controller 104 determines its $NB_{ReproductionDelay}$ or $BB_{ReproductionDelay}$ and recalculates $NB_{TransmissionTimestampDelay}$ or $BB_{ReproductionTimestampDelay}$ if determined appropriate. Thus, although the System 100 may contain many End Devices, the NB/BB Controller 104 is able to adjust the $NB_{TransmissionTimestampDelay}$ and $BB_{ReproductionTimestampDelay}$ to account for only those End Devices that are to reproduce a given audio signal (e.g. that are present on the channel and joined to a particular group). In addition, if desired, the NB/BB Controller 104 can calculate and store delays on a per-End Device basis, instead of on a per-group basis. Doing so permits the NB/BB Controller 104 to, for example, reduce the delay of the audio signal to the reproducing End Devices if the transmitting End Device is also the End Device which exhibits the longest propagation delay.

When the first $Audio_{Frame0}$ from NB Uplink Audio Stream 140 arrives at the NB/BB Controller 104, the NB/BB Controller 104 immediately samples both the synchronized NB Clock 114 (hereinafter referred to as $NB_{TimestampStart}$) and the synchronized BB Clock 115 (hereinafter referred to as $BB_{TimestampStart}$).

Each $Audio_{FrameN}$ in NB Downlink Audio Stream 144 contains a $NB_{TransmissionTimestampN}$ which is calculated per the following algorithm:

$$NB_{TransmissionTimestampN} = NB_{TimestampStart} + NB_{TransmissionTimestampDelay} + (Audio_{FrameTime} * N)$$

where $Audio_{FrameTime}$ is the duration of audio, specified in units of the NB Clock 114, contained in each $Audio_{FrameN}$ of the NB Downlink Audio Stream 144. In the following example, each $Audio_{FrameN}$ contains 180 milliseconds of audio (i.e. $Audio_{FrameTime}=180$). It is understood that $Audio_{FrameTime}$ could differ (e.g., 20 milliseconds, 60 milliseconds) based on the system configuration and types of RAN technologies employed.

For simplicity, assume that NB Clock 114 units are represented in units of milliseconds. Therefore:

$$NB_{TransmissionTimestamp0} = NB_{TimestampStart} + NB_{TransmissionTimestampDelay} + (180*0)$$

This continues:

$$NB_{TransmissionTimestamp1} = NB_{TimestampStart} + NB_{TransmissionTimestampDelay} + (180*1)$$

$$NB_{TransmissionTimestamp2} = NB_{TimestampStart} + NB_{TransmissionTimestampDelay} + (180*2)$$

The NB Base Stations 120 receiving NB Downlink Audio Stream 144 follow ordinary simulcast behavior, waiting until their NB Clocks 114 are equal to the specified $NB_{TransmissionTimestampN}$ before transmitting the corresponding $Audio_{FrameN}$ to NB End Devices 132.

Each $Audio_{FrameN}$ in BB Downlink Audio Packets 145 contains a $BB_{ReproductionTimestampN}$ which is calculated per the following algorithm:

$$BB_{ReproductionTimestampN} = BB_{TimestampStart} + BB_{ReproductionTimestampDelay} + (Audio_{FrameTime} * N)$$

where $Audio_{FrameTime}$ is the duration of audio, specified in units of the BB Clock 115, contained in each $Audio_{FrameN}$ of the BB Downlink Audio Packets 145.

The BB End Devices 133 receiving BB Downlink Audio Packets 145 by way of BB Base Stations 121 wait until their BB Clocks 115 are equal to the $BB_{ReproductionTimestampN}$ before acoustically reproducing the associated $Audio_{FrameN}$. The BB End Devices 133 perform decryption and decompression to prepare the packet contents such that the audio waveform can be presented to the listener at the time indicated by $BB_{ReproductionTimestampN}$. If, for whatever reason, the BB End Device 133 is late reproducing a particular $Audio_{FrameN}$, it may employ techniques such as time compression to align with future $BB_{ReproductionTimestamps}$ embedded in Downlink BB Audio Packets 145. The term "late" may be set by an arbitrary threshold (hereinafter referred to as $BB_{ReproductionThreshold}$) of 180 milliseconds, for example. If $BB_{ReproductionThreshold}$ is exceeded, the packet(s) may be skipped and audio reproduction may be started on time with subsequent packets.

Figure 2:
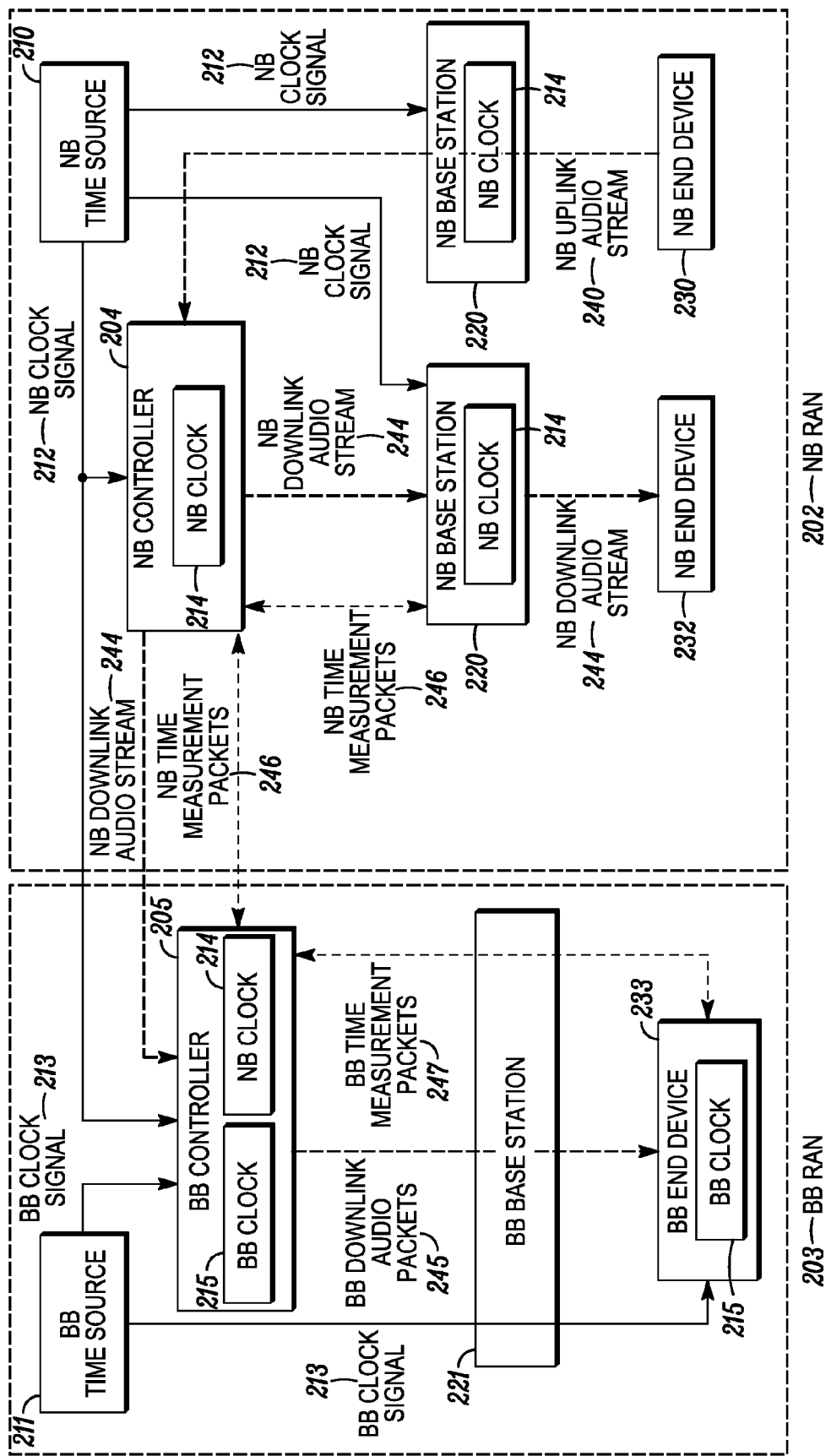
FIG. 2 illustrates another embodiment of a system.

Another embodiment of the heterogeneous communication system is shown in FIG. 2. This System 200 includes a NB Controller 204, a BB Controller 205, a NB Time Source 210, a BB Time Source 211, NB Base Stations 220, BB Base Stations 221, NB End Devices 230, 232, and BB End Devices 233. A common BB Time Source 211 is used to synchronize the BB Clock 215 in BB Controller 205 and BB End Device 233. A common NB Time Source 210 is used to synchronize the NB Clock 214 in NB Controller 204, BB Controller 205, and NB Base Stations 220. Although only NB End Device 230 is shown to request the floor and transmit audio, it is understood that BB End Devices 233 are equally capable of such behavior. In such cases, the audio stream from a BB End Device 233 is first forwarded to NB Controller 204 such that it may be processed in a manner similar to that of NB Uplink Audio Stream 240.

In the embodiment of FIG. 1, a single NB/BB Controller 104 repeats NB Uplink Audio Stream 140 to both the NB and BB End Devices 132, 133 through NB and BB RANs 102, 103 respectively. In the embodiment of FIG. 2, however, a NB Controller 204 repeats NB Uplink Audio Stream 240 to the NB End Devices 232 through NB RAN 202 and a separate BB Controller 205 repeats NB Uplink Audio Stream 240 to the BB End Devices 233 through BB RAN 203. In this embodiment, the NB Controller 204 treats the BB Controller 205 similar to another NB Base Station 220. Thus, the NB Controller 204 repeats NB Uplink Audio Stream 240 as NB Downlink Audio Stream 244 to the BB Controller 205. Doing so essentially permits an ordinary NB simulcast controller in NB RAN 202 to be used as the NB Controller 204. The BB Controller 205, upon receiving NB Downlink Audio Stream 244 from NB Controller 204, reformats and repeats the audio stream as BB Downlink Audio Packets 245 to the BB End Devices 233 by way of BB Base Stations 221.

Similar to the embodiment of FIG. 1, the BB Controller 205 periodically measures $BB_{PropagationDelayDeviceN}$ from the BB Controller 205 to a representative set, e.g. all, of the BB End Devices 233 using the BB Time Measurement Packets 247. As before, all such $BB_{PropagationDelayDeviceN}$ measurements to each BB End Device 233 are then compared and a statistically significant (e.g. worst case, 99% worst case, 95% worst case, 90% worst case) one-way propagation delay from the BB Controller 205 to all BB End Devices 233 is recorded as $BB_{PropagationDelay}$. The statistically significant delay from the time an audio frame is sent from the BB Controller 205 to the time the audio signal it contains is acoustically reproduced by the speaker in the BB End Device 233 is then calculated as:

$$BB_{ReproductionDelay} = BB_{PropagationDelay} + BB_{DeviceProcessingDelay}$$

where $BB_{DeviceProcessingDelay}$ is the known time to process (e.g., demodulate, error-correct, de-jitter, and decode) audio packets in the BB End Devices 233. $BB_{DeviceProcessingDelay}$ is measured or estimated prior to BB End Device 233 being shipped and device-to-device variation is again comparatively negligible. As in the embodiment of FIG. 1, $BB_{ReproductionDelay}$ may be periodically recalculated by BB Controller 205, which permits modification of $BB_{ReproductionDelay}$ as participating BB End Devices 233 are added to or removed from the BB RAN 203.

The NB Controller 204 periodically measures $NB_{PropagationDelayBaseSiteN}$ from the NB Controller 204 to each NB Base Station 220 using the NB Time Measurement Packets 246. In contrast to the embodiment of FIG. 1, however, the NB Controller 204 depicted in the embodiment of FIG. 2 considers BB Controller 205 to be another NB Base Station 220. As with all other NB Base Stations 220, the NB Controller samples its NB Clock 214, and sends a time-stamped message containing this value to BB Controller 205. Upon receiving NB Time Measurement Packet 246, BB Controller 205 subtracts the embedded timestamp from its NB Clock 214 to derive the one-way signal propagation delay (hereinafter referred to as $NB_{PropagationDelayBBController}$) between the NB Controller 204 and the BB Controller 205. Unlike the operation of other NB Base Stations 220, however, the BB Controller 205 does not merely return $NB_{PropagationDelayBBController}$ back to NB Controller 204. Instead, BB Controller 205 calculates a new $NB_{PropagationDelayBBController\dagger}$ per the following algorithm:

$$NB_{PropagationDelayBBController\dagger} = NB_{PropagationDelayBBController} + BB_{ReproductionDelay^*} - NB_{DeviceProcessingDelay};$$

where $NB_{DeviceProcessingDelay}$ is the known time, in units of NB Clock 214, to process (e.g., demodulate, error-correct, and decode) the audio signal in NB End Devices 232. $BB_{ReproductionDelay^*}$ is the $BB_{ReproductionDelay}$ in units of NB Clock 214. Once $NB_{PropagationDelayBBController\dagger}$ is calculated, BB Controller 205 returns this value to NB Controller 204 in a NB Time Measurement Packet 246.

Figure 4:
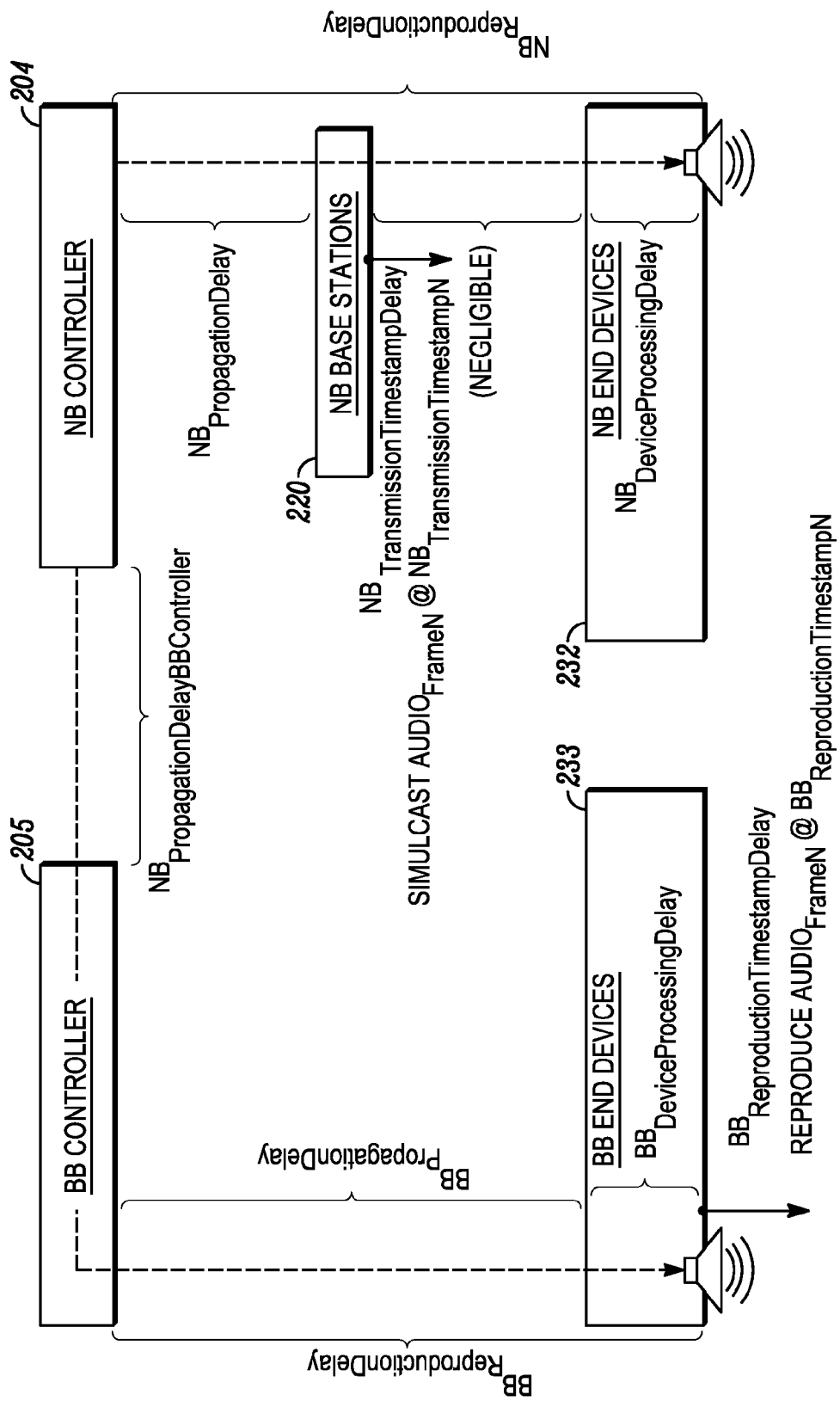
FIG. 4 illustrates the calculated time delays in the embodiment of FIG. 2.

All $NB_{PropagationDelayBasesiteN}$ measurements to each NB Base Station 220 along with $NB_{PropagationDelayBBController\dagger}$ as calculated above are then compared and a statistically significant (e.g. worst case, 99% worst case, 95% worst case, 90% worst case) one-way propagation delay (hereinafter referred to as $NB_{PropagationDelay}$) from the NB Controller 204 to all NB Base Stations 220 and BB Controller 205 is recorded in the NB Controller 204. The wireless propagation delay between the NB Base Station 220 and the NB End Devices 232 is comparatively negligible. The statistically significant delay from the time an audio frame is sent from the NB Controller 204 to the time the audio signal it contains is acoustically reproduced by the speaker in the NB End Device 232 is then calculated as:

$$NB_{ReproductionDelay} = NB_{PropagationDelay} + NB_{DeviceProcessingDelay}$$

where $NB_{DeviceProcessingDelay}$ is the known time to process (e.g., demodulate, error-correct, and decode) the audio signal in the NB End Devices 232. $NB_{DeviceProcessingDelay}$ is measured or estimated prior to the NB End Devices 232 being shipped and device-to-device variation is again comparatively negligible. Unlike the embodiment of FIG. 1, $NB_{ReproductionDelay}$ is also inclusive of the $NB_{PropagationDelayBBController\dagger}$ as reported by BB Controller 205 (which is itself inclusive of $BB_{ReproductionDelay}$). In this way, a NB Downlink Audio Stream 244 simulcast by NB Base Stations 220 may be delayed to ensure acoustic alignment of NB End Devices 232 to BB End Devices 233. $NB_{ReproductionDelay}$ may be periodically recalculated by NB Controller 204, which permits modification of $NB_{ReproductionDelay}$ as participating NB Base Stations 220 or BB End Devices 233 are added to or removed from the System 200. A diagram of the time delays described above in relation to the embodiment of FIG. 2 is shown in FIG. 4.

As in the embodiment of FIG. 1, the NB Controller 204 provides a $NB_{TransmissionTimestampN}$ to NB Base Stations 220 for each $Audio_{FrameN}$ embedded in NB Downlink Audio Stream 244. To facilitate this, NB Controller 204 calculates $NB_{TransmissionTimestampDelay}$ which represents the delay from a starting time 0, in units of the NB Clock 214, at which the first $Audio_{Frame0}$ is to be simulcast to NB Base Stations 220 and BB Controller 205. As in an ordinary NB RAN 202, NB Controller 204 assigns $NB_{TransmissionTimestampDelay}$ as follows:

$$NB_{TransmissionTimestampDelay} = NB_{PropagationDelay}$$

Similar to the embodiment of FIG. 1, NB End Device 230 transmits NB Uplink Audio Stream 240 to NB Controller 204 through a NB Base Station 220. When the first $Audio_{Frame0}$ from NB Uplink Audio Stream 240 arrives at the NB Controller 204, the NB Controller 204 immediately samples the synchronized NB Clock 214 (hereinafter referred to as $NB_{TimestampStart}$).

Each $Audio_{FrameN}$ in NB Downlink Audio Stream 244 will contain a $NB_{TransmissionTimestampN}$ which is calculated per the following algorithm:

$$NB_{TransmissionTimestampN} = NB_{TimestampStart} + NB_{TransmissionTimestampDelay} + (Audio_{FrameTime} * N)$$

where $Audio_{FrameTime}$ is the duration of audio, specified in units of the NB Clock 214, contained in each $Audio_{FrameN}$ of the NB Downlink Audio Stream 244.

The NB Base Stations 220 receiving NB Downlink Audio Stream 244 follow ordinary simulcast behavior, waiting until their NB Clocks 214 are equal to the $NB_{TransmissionTimestampN}$ before broadcasting $Audio_{FrameN}$ to NB End Devices 232.

The BB Controller 205 also receives NB Downlink Audio Stream 244 with embedded $NB_{TransmissionTimestampN}$s for each $Audio_{FrameN}$. As in the embodiment of FIG. 1, BB Controller 205 provides a $BB_{ReproductionTimestampN}$ to BB End Devices 233 for each $Audio_{FrameN}$ in BB Downlink Audio Packets 245. The BB Controller 205 calculates $BB_{ReproductionTimestampN}$ for each $Audio_{FrameN}$ received in NB Downlink Audio Stream 244 as follows:

$$BB_{ReproductionTimestampN} = NB_{TransmissionTimestampN^*} + NB_{DeviceProcessingDelay^*}$$

where $NB_{TransmissionTimestampN^*}$ is the received $NB_{TransmissionTimestampN}$ in units of BB Clock 215, and $NB_{DeviceProcessingDelay^*}$ is the $NB_{DeviceProcessingDelay}$ in units of BB Clock 215. This translation between clock units is possible, since BB Controller 205 knows the respective frequencies (e.g. 1 kHz, 1 MHz, 1 GHz) and relationship (i.e. at a given instant in time, it can sample both clocks) of both NB Clock 214 and BB Clock 215. As in the embodiment of FIG. 1, $NB_{DeviceProcessingDelay}$ is measured or estimated prior to the NB End Devices 232 being shipped and device-to-device variation is again comparatively negligible.

The BB End Devices 233 receiving BB Downlink Audio Packets 245 by way of BB Base Stations 221 wait until their BB Clocks 215 are equal to the $BB_{ReproductionTimestampN}$ before acoustically reproducing $Audio_{FrameN}$. The BB End Devices 233 perform decryption and decompression to prepare the packet contents such that the audio waveform can be presented to the listener at the time indicated by $BB_{ReproductionTimestampN}$.

In the case of either of the two embodiments presented, certain rare conditions may lead to excessively long measured values of $NB_{PropagationDelayBasesiteN}$ and $BB_{PropagationDelayDeviceN}$. In such cases, these values are not representative of the vast majority of similarly measured delays. The NB and/or BB Controllers can take this into account by discarding those delays that are in a preset percentile of the longest delays measured (e.g. >95%, >98%, >99%). This measurement is calculated by ordering all of the $NB_{PropagationDelayBasesiteN}$ measurement values into an ordered set from minimum to maximum value. If, for example, the worst 90% $NB_{PropagationDelayBasesiteN}$ measurement value is to be selected, the value in that ordered set whose index is 0.9 times the number of values in the set is chosen. If, for example, the worst 95% $NB_{PropagationDelayBasesiteN}$ measurement value is to be selected, the value in that ordered set whose index is 0.95 times the number of values in the set is chosen. This same method can be applied to the measured $BB_{PropagationDelayDeviceN}$ values. Note any other statistical measure (e.g. time delays greater than two or three standard deviations from the mean delay time) can alternatively be used. This measure provides a method of filtering out the extreme delay cases from greatly increasing the overall audio reproduction delay experienced by all of the End Devices affiliated to a given group at the possible understood cost of occasional overlapping audio and/or floor acquisition difficulty.

Although audio signals have been discussed, media signals other than solely audio signals (e.g. text, device control, video) can also be coordinated using the above technique. In addition, although only NB simulcast and BB RANs were described above, any set of heterogeneous networks which utilize similar timing mechanisms can be used. The above term "audio signal" is intended to encompass signals communicated between the various components in the network that contain audio information to reproduce the original audio signal sent from the originating End Device to the reproducing End Devices (e.g. compressed or encrypted signals that are based on, but are not exactly, the original audio signal).

The techniques shown in FIGS. 1 and 2 coordinate audio or other media reproduction across heterogeneous communication systems. By synchronizing the presentation time of audio to a group, collocated end devices all present audio at roughly the same time, providing coherent reproduction of the original audio. Thus, multiple listeners hear the same audio from multiple end devices simultaneously and fair access to a given floor in half-duplex communication systems is provided as each listener is given the opportunity to attempt floor acquisition at about the same instant in time. Either embodiment contains the ability to delay audio to each RAN of the heterogeneous system independently, thereby accommodating End Devices that have significantly longer transmission-to-reproduction delays.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of coordinating audio reproduction for heterogeneous end devices in heterogeneous first and second networks, the method comprising:

receiving an audio signal from one of the heterogeneous end devices in the heterogeneous first and second networks;

associating, at at least one controller, a first timestamp with a first audio stream and a second timestamp with a second audio stream, the first and second timestamps being different, each of the first and second audio streams containing audio information of the received audio signal; and sending the first audio stream to a first end device in the first network and the second audio stream to a second end device in the second network, the first and second timestamps providing timing information such that the audio signal is reproducible by the first and second end devices at a substantially simultaneous time, wherein the first timestamp is used by the first end device to reproduce the first audio stream or by a first communication device serving the first end device to provide the first audio stream for reproduction by the first end device, and wherein the second timestamp is used by the second end device to reproduce the second audio stream or by a second communication device serving the second end device to provide the second audio stream for reproduction by the second end device.

2. The method of claim 1, wherein the first network is a narrowband simulcast network, the first end device is a narrowband end device, the first timestamp comprises a GPS-derived simulcast transmission timestamp, the second network is an IP-enabled broadband network, the second end device is an IP-enabled broadband end device, and the second timestamp comprises a time-of-day reproduction timestamp.

3. The method of claim 1, further comprising delaying reproduction of the audio signal in the first network using the first timestamp and in the second network using the second timestamp, the reproduction being delayed to account for a longest delay in the first and second networks, the longest delay being a longest time interval between when the first and second audio streams are sent from a controller to the heterogeneous end devices to when a last of the heterogeneous end devices reproduces the audio signal.

4. The method of claim 3, wherein generation of the first and second timestamps occur within a single controller, further comprising the controller calculating the first and second timestamps using an algorithm having:
 a first quantity equaling a first delay between when the first audio stream is sent from a controller to when an intermediary responsible for forwarding the first audio stream to a last of first end devices in the first network receives the first audio stream plus a time to process the first audio signal in the last of the first end devices,
 a second quantity equaling a second delay between when the second audio stream is sent from a controller to when a last of second end devices in the second network receives the second audio stream plus a time to process the second audio signal in the last of the second end devices,
 a third quantity equaling the product of N and the time represented by a single frame of audio, where N is a monotonically increasing integer starting at 0 and incremented for each successive audio frame processed, and
 an initial clock time initialized at the start of the first audio stream,
 in which in the algorithm:
 if the longest delay is a result of the delay between the controller and one of the end devices in the first network, then:
  the first timestamp is equal to the initial clock time plus the first quantity minus the time to process the first audio signal in the last of the first end devices plus the third quantity, and
  the second timestamp is equal to the initial clock time plus the first quantity plus the third quantity; otherwise
 if the longest delay is a result of the delay between the controller and one of the second end devices, then:
  the first timestamp is equal to the initial clock time plus the second quantity minus the time to process the first audio signal in the last of the first end devices plus the third quantity, and
  the second timestamp is equal to the initial clock time plus the second quantity plus the third quantity.

5. The method of claim 3, wherein generation of the first and second timestamps occurs within first and second controllers, respectively, the first and second controllers are different, and the second controller adheres to the interface behaviours of a first base station in the first network.

6. The method of claim 3, wherein generation of the first and second timestamps occurs within first and second controllers, respectively, the first and second controllers are different, the second controller provides a one-way delay measurement to the first controller, and the one-way delay measurement is calculated using an algorithm having:
 a first quantity equaling a first delay between when the first audio stream is sent from the first controller to when the second controller receives the first audio stream, the second controller responsible for forwarding the second audio stream to a last of second end devices in the second network, and
 a second quantity equaling a second delay between when the second audio stream is sent from the second controller to when the last of second end devices in the second network receives the second audio stream plus a time to process the second audio signal in the last of the second end devices,
 in which:
  the one-way delay measurement calculated by the second controller and returned to the first controller is equal to the first quantity plus the second quantity minus a time to process the first audio signal in the last of the first end devices.

7. The method of claim 3 wherein generation of the first and second timestamps occurs within first and second controllers, respectively, the first and second controllers are different, the method further comprising calculating the first and second timestamps using an algorithm having:
 a first quantity equaling a first delay between when the first audio stream is sent from the first controller to when an intermediary responsible for forwarding the first audio stream to a last of first end devices in the first network receives the first audio stream,
 a second quantity equaling a second delay between when the first audio stream is sent from the first controller to when the second controller receives the first audio stream, the second controller responsible for forwarding the second audio stream to a last of second end devices in the second network,
 a third quantity equaling a third delay between when the second audio stream is sent from the second controller to when the last of second end devices in the second network receives the second audio stream plus a time to process the second audio signal in the last of the second end devices,
 a fourth quantity equaling the second quantity plus the third quantity minus a time to process the first audio signal in the last of the first end devices,
 a fifth quantity equaling the larger of first or fourth quantities,
 a sixth quantity equaling the product of N and the time represented by a single frame of audio, where N is a monotonically increasing integer starting at 0 and incremented for each successive audio frame processed, and
 an initial clock time initialized at the start of the first audio stream,
 in which:
  the first timestamp is equal to the initial clock time plus the fifth quantity plus the sixth quantity, and
  the second timestamp is equal to the first timestamp plus the time to process the first audio signal in the last of the first end devices.

8. The method of claim 3, further comprising adjusting the longest delay to reproduce the audio signal whenever at least one heterogeneous end device joins or leaves a group including the first and second end devices if the at least one heterogeneous end device affects the longest delay in a statistically significantly fashion.

9. The method of claim 1, further comprising:
calculating a delay from when an initial signal is sent from the at least one controller to a particular heterogeneous end device to when the particular heterogeneous end device reproduces the initial signal for each of the heterogeneous end devices;
discarding the calculated delays that are in a statistically significant percentile of the delays calculated to establish a longest delay; and
delaying the reproduction of the audio signal, using the first and second timestamps, to account for the longest delay.

10. The method of claim 1, wherein the first end device uses the first timestamp to reproduce the first audio stream and a base station serving the second end device uses the second timestamp to provide the second audio stream for reproduction by the second end device.

11. A network comprising:
a first network having first base stations and first end devices;
a second network having second base stations and second end devices, the first and second end devices being heterogeneous; and
a controller that:
receives an audio signal from one of the first or second end devices,
associates a first timestamp with a first audio stream and a second timestamp with a second audio stream, each of the first and second audio streams containing audio information of the received audio signal, the first and second timestamps being different and providing timing information such that the audio signal is reproducible by the first and second end devices at a substantially simultaneous time,
sends the first audio stream and the first timestamp to at least one of the first base stations, and
sends the second audio stream and the second timestamp to at least one of the second base stations,
the at least one of the first base stations transmitting the first audio stream to a first end device associated with the at least one of the first base stations at a time indicated by the first timestamp,
the at least one of the second base stations transmitting the second audio stream to a second end device associated with the at least one of the second base stations, and
the second end device reproducing the audio signal contained in the second audio stream at a time indicated by the second timestamp.

12. The network of claim 11, wherein the first network is a narrowband simulcast network, the first base stations are narrowband simulcast base stations, the first end devices are narrowband end devices, the first timestamp is a GPS-derived simulcast transmission timestamp, the second network is an IP-enabled broadband network, the second base stations are IP-enabled broadband base stations, the second end devices are IP-enabled broadband end devices, and the second timestamp comprises a time-of-day reproduction timestamp.

13. The network of claim 11, wherein the controller further calculates and stores a longest delay for reproduction of the audio signal and accommodates the longest delay using the first and second timestamps, the longest delay being a longest time interval between when the first and second audio streams are sent from the controller to the first and second end devices to when a last of the first and second end devices reproduces the audio signal.

14. The network of claim 11, wherein the controller receives delay measurements from the first base stations and second end devices and calculates the longest delay using the delay measurements.

15. The network of claim 11, wherein the controller further:
calculates a delay from when an initial signal is sent from the controller to a particular first or second end device to when the particular first or second end device reproduces the initial signal for each of the first and second end devices;
discards the calculated delays that are in a statistically significant percentile of longest delays calculated to establish a longest delay of the calculated delays that have not been discarded; and
stores the longest delay for reproduction of the audio signal; and
calculates the first and second timestamps using the longest delay.

16. The network of claim 11, wherein generation of the first and second timestamps occur within a single controller, the network further comprising a controller calculating the first and second timestamps using an algorithm having:
a first quantity equaling a first delay between when the first audio stream is sent from the controller to when a first base station forwarding the first audio stream to a last of the first end devices receives the first audio stream plus a time to process the first audio signal in the last of the first end devices,
a second quantity equaling a second delay between when the second audio stream is sent from the controller to when a last of the second end devices receives the second audio stream plus a time to process the second audio signal in the last of the second end devices,
a third quantity equaling the product of N and the time represented by a single frame of audio, where N is a monotonically increasing integer starting at 0 and incremented for each successive audio frame processed, and
an initial clock time initialized at the start of the first audio stream,
in which in the algorithm:
if the longest delay is a result of the delay between the controller and one of the first end devices, then:
the first timestamp is equal to the initial clock time plus the first quantity minus the time to process the first audio signal in the last of the first end devices plus the third quantity, and
the second timestamp is equal to the initial clock time plus the first quantity plus the third quantity; otherwise
if the longest delay is a result of the delay between the controller and one of the second end devices, then:
the first timestamp is equal to the initial clock time plus the second quantity minus the time to process the first audio signal in the last of the first end devices plus the third quantity, and
the second timestamp is equal to the initial clock time plus the second quantity plus the third quantity.

17. The network of claim 11, wherein the controller comprises a first controller and a second controller, the first controller sending the first audio stream and the first timestamp to both the first base stations and to the second controller, the second controller generating the second timestamp in response to receiving the first timestamp and sending the second audio stream and the second timestamp to the second end devices through the second base stations.

18. The network of claim 17, wherein the second controller adheres to the interface behaviours of a first base station in the first network.

19. The network of claim 17, wherein the second controller provides a one-way delay measurement to the first controller, the one-way delay measurement is calculated using an algorithm having:
- a first quantity equaling a first delay between when the first audio stream is sent from the first controller to when the second controller receives the first audio stream, the second controller responsible for forwarding the second audio stream to a last of second end devices in the second network, and
- a second quantity equaling a second delay between when the second audio stream is sent from the second controller to when the last of second end devices in the second network receives the second audio stream plus a time to process the second audio signal in the last of the second end devices, in which:
  the one-way delay measurement calculated by the second controller and returned to the first controller is equal to the first quantity plus the second quantity minus a time to process the first audio signal in the last of the first end devices.

20. The network of claim 17, wherein the first controller calculates the first and second delays using an algorithm having:
- a first quantity equaling a first delay between when the first audio stream is sent from the first controller to when a first base station responsible for forwarding the first audio stream to a last of first end devices in the first network receives the first audio stream,
- a second quantity equaling a second delay between when the first audio stream is sent from the first controller to when the second controller receives the first audio stream,
- the second controller responsible for forwarding the second audio stream to a last of second end devices in the second network,
- a third quantity equaling a third delay between when the second audio stream is sent from the second controller to when the last of second end devices in the second network receives the second audio stream plus a time to process the second audio signal in the last of the second end devices,
- a fourth quantity equaling the second quantity plus the third quantity minus the time to process the first audio signal in the last of the first end devices,
- a fifth quantity equaling the larger of first or fourth quantities,
- a sixth quantity equaling the product of N and the time represented by a single frame of audio, where N is a monotonically increasing integer starting at 0 and incremented for each successive audio frame processed, and
- an initial clock time initialized at the start of the first audio stream, in which:
  the first timestamp is equal to the initial clock time plus the fifth quantity plus the sixth quantity, and
  the second timestamp is equal to the first timestamp plus the time to process the first audio signal in the last of the first end devices.

* * * * *

UNITED STATES PATENT AND TRADEMARK OFFICE
CERTIFICATE OF CORRECTION

PATENT NO. : 7,899,193 B2  
APPLICATION NO. : 12/133882  
DATED : March 1, 2011  
INVENTOR(S) : Bekiares et al.

Page 1 of 1

It is certified that error appears in the above-identified patent and that said Letters Patent is hereby corrected as shown below:

On the Title Page, in Field (56), under "OTHER PUBLICATIONS", in Column 1, Line 2, delete "et. at" and insert -- et al. --, therefor.

On the Title Page, in Field (56), under "OTHER PUBLICATIONS", in Column 2, Line 12, delete "Synchronizatio" and insert -- Synchronization --, therefor.

In Column 3, Lines 38-42, delete "Uplink Audio.......Stations 120." and insert the same at Line 37, after "NB" as a continuation paragraph.

In Column 4, Line 16, delete "$Audio_{FrameN}s$," and insert -- $Audio_{FrameN}(s)$, --, therefor.

In Column 4, Line 17, delete "$NB_{TransmissionTimestampN}s$," and insert -- $NB_{TransmissionTimestampN}(s)$, --, therefor.

In Column 4, Line 66, delete "$BB_{ReproductionTimestampN}s$" and insert -- $BB_{ReproductionTimestampN}(s)$ --, therefor.

In Column 8, Line 16, delete "$BB_{ReproductionTimestamp}s$" and insert -- $BB_{ReproductionTimestamp}(s)$ --, therefor.

In Column 10, Line 47, delete "$NB_{TransmissionTimestampN}s$" and insert -- $NB_{TransmissionTimestampN}(s)$ --, therefor.

In Column 14, Line 28, in Claim 7, delete "claim 3" and insert -- claim 3, --, therefor.

Signed and Sealed this  
Eighth Day of January, 2013

David J. Kappos  
*Director of the United States Patent and Trademark Office*